(12) United States Patent
Enoki et al.

(10) Patent No.: US 10,367,816 B2
(45) Date of Patent: Jul. 30, 2019

(54) INVALIDATION OF AN ACCESS TOKEN

(71) Applicant: INTERNATIONAL BUSINESS MACHINES CORPORATION, Armonk, NY (US)

(72) Inventors: Miki Enoki, Tokyo (JP); Rika Nagahara, Tokyo (JP); Takahide Nogayama, Tokyo (JP); Takashi Sakairi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/296,787

(22) Filed: Oct. 18, 2016

(65) Prior Publication Data

US 2018/0109539 A1     Apr. 19, 2018

(51) Int. Cl.
    *H04L 29/06*      (2006.01)

(52) U.S. Cl.
    CPC .......... *H04L 63/10* (2013.01); *H04L 63/0407* (2013.01)

(58) Field of Classification Search
    CPC ....... H04L 63/108; H04L 29/06; G06F 21/10; G06F 21/6218
    See application file for complete search history.

(56) References Cited

U.S. PATENT DOCUMENTS

| | | | |
|---|---|---|---|
| 6,393,468 B1 * | 5/2002 | McGee | G06F 21/10 709/218 |
| 9,231,955 B1 | 1/2016 | Mehresh et al. | |
| 2014/0075513 A1 * | 3/2014 | Trammel | H04L 9/3213 726/4 |
| 2014/0096224 A1 | 4/2014 | Liu et al. | |
| 2015/0150110 A1 * | 5/2015 | Canning | H04L 63/0807 726/9 |

OTHER PUBLICATIONS

Bradley, J. "The problem with OAuth for Authentication", Jan. 2012. pp. 8, available at http://www.thread-safe.com/2012/01/problem-with-oauth-for-authenticat.

Hardt, D. "The OAuth 2.0 Authorization Framework", Internet Engineering Task Force (IETF), RFC-6749. Oct. 2012. (77 Pages).

* cited by examiner

*Primary Examiner* — Dao Q Ho (74) *Attorney, Agent, or Firm* — Tutunjian & Bitetto, P.C.; Vazken Alexanian (57) ABSTRACT

A computer-implemented method for invalidating an access token includes generating an access token and an HTML file in response to receipt of a request for issuing the access token, the HTML file comprising a set of instructions for rendering on one window in a browser, a code for generating a child segment in a memory which is controlled by the window, and a code for invalidating the access token in response to completion of rendering on the child segment, in response to completion of receiving, from a resource server, one or more resources requested by a client program executed on the child segment or in response to closing of the window, sending the access token and the HTML file to the browser, and invalidating the access token, in response to receipt, from the browser, of a request for invalidating the access token.

21 Claims, 8 Drawing Sheets

URI 1 = HTML 1

URI 2 = HTML 2

URI 1 = HTML 1 in HTML 1

```
<html>
    :
    <iframe src = 'URI 2' />
    :
```

INVALIDATION OF AN ACCESS TOKEN

BACKGROUND

Technical Field

The present invention generally relates to web services, and more specifically, to an invalidation of an access token used in the web services.

Related Art

Currently, many web services provide an Application Program Interface (API) to allow third party applications to utilize their data. When the third party application needs to access user's private data, it should be authenticated. Open Authentication (hereinafter referred to as "OAuth") is a popular manner of authentication and is employed by many web services. The OAuth is an open standard, which enables a resource owner (or a user) to allow a third party application to access users' private resources stored on a website without providing the third party application with a username and password. The OAuth allows a user to provide an access token instead of a username and password to access data kept at a specific service provider by the user. Each access token authorizes one particular website to access particular resources within a certain period of time, that is, an access token is only valid for a limited period of time. As such, the OAuth allows users to authorize a third party application to access their particular resources stored at another service provider without sharing their access permission or all the resources. The OAuth is characterized in that a third party application cannot directly acquire the user's password; rather, the application uses an access token authorized by the user to perform access.

The OAuth protocol has versions OAuth 1.0 and now OAuth 2.0. The OAuth 2.0 Authorization Framework is defined in RFC6749 and may replace and obsolete the OAuth 1.0 protocol described in RFC5849.

The OAuth focuses on client developer simplicity while providing specific authorization flows for web applications, desktop applications, mobile phones, and living room devices. The OAuth is widely used on major Social Networking Services (SNS), such as Box®, Dropbox®, Evernote®, Facebook®, Google®, Instagram®, LinkedIn®, PayPal®, Twitter®, Yahoo® Japan, and Windows Live®. This is because the OAuth is simple and implemented by several programming languages.

An authorization grant is a credential representing the resource owner's authorization (to access its protected resources) used by the client to obtain an access token. The OAuth mainly has the following four authorization grant types: an authorization code grant; an implicit grant, a resource owner password credentials grant, and client credentials grant.

For example, if both the client (or a client program) and the user agent (or a browser) of a resource owner (or an end-user) are working on the common client device, the implicit grant can be used.

The OAuth protocol, especially implicit grant, is known to have a high security risk of a leak of an access token.

In the implicit grant, an access token which was issued from an authorization server is transferred on a communication path from a client device associated with the resource owner to the authorization server, and then stored on the memory of the client device. In a case where a malware that can read contents of the communication or memory, the access token can be illegally reused by the malware. In the authorization code grant, the OAuth client works on the different computer from the client device. But the same thing that happens to the implicit grant can happen to the authorization code grant if the malware exists on the same computer of the OAuth client.

SUMMARY

According to one aspect of the present invention, a computer-implemented method for invalidating an access token is provided. The method comprises generating an access token and an HTML file in response to receipt of a request for issuing the access token, the HTML file comprising a set of instructions for rendering on one window in a browser, a code for generating a child segment in a memory which is controlled by the window, and a code for invalidating the access token in response to completion of rendering on the child segment, sending the access token and the HTML file to the browser, and invalidating the access token, in response to receipt, from the browser, of a request for invalidating the access token.

According to another aspect of the present invention, a computer-implemented method for invalidating an access token is provided. The method comprises generating an access token and an HTML file in response to receipt of a request for issuing the access token, the HTML file comprising a set of instructions for rendering on one window in a browser, a code for generating a child segment in a memory which is controlled by the window, and a code for invalidating the access token in response to completion of receiving, from a resource server, one or more resources requested by a client program executed on the child segment or in response to closing of the window, sending the access token and the HTML file to the browser, and invalidating the access token, in response to receipt, from the browser, of a request for invalidating the access token.

In an embodiment, the access token is issued using the OAuth protocol.

In an embodiment, the code for generating the child segment is one described using a program.

In an embodiment, the code for invalidating the access token comprises a URI (Uniform Resource Identifier) for invalidating the access token.

In an embodiment, the URI is a URI for an authorization server.

In an embodiment, the browser is executed on a client device associated with a resource owner.

In an embodiment, the child segment has a display section for the child segment and a result of execution of a client program which is executed on the child segment is displayed on the display section.

In an embodiment, one or more resources requested by the client program are received, from a resource server, at the client program.

In an embodiment, the steps described in the present invention are executed on an authorization server.

According to another aspect of the present invention, a computer-implemented method for invalidating an access token is provided. The method comprises receiving, from an authorization server, an access token and HTML file which were generated by the authorization server, wherein the HTML file comprises a set of instructions for rendering on one window in a browser, a code for generating a child segment in a memory which is controlled by the window, and a code for invalidating the access token in response to closing of the window, in response to completion of rendering on the child segment or in response to completion of receiving, from a resource server, one or more resources requested by a client program executed on the child segment, generating the child segment and then executing the client program on the child segment, and in response to closing of the window, in response to a completion of rendering on the child segment or in response to a completion of receiving, from a resource server, one or more resources requested by the client program, sending the request for invalidating the access token to the authorization server.

In an embodiment, the access token is issued using the OAuth protocol.

In an embodiment, the code for generating the child segment is one described using a program.

In an embodiment, the code for invalidating the access token comprises a URI for invalidating the access token.

In an embodiment, the URI is a URI for an authorization server.

In an embodiment, the browser is executed on a client device associated with a resource owner.

In an embodiment, the child segment has a display section for the child segment and a result of execution of a client program which is executed on the child segment is displayed on the display section.

In an embodiment, one or more resources requested by the client program are received, from a resource server, at the client program.

In an embodiment, the steps described in the present invention are executed on a client device associated with a resource owner.

According to another aspect of the present invention, a system, such as a computer system, comprising a processor and a memory storing a program of instructions executable by the processor to perform one or more methods described herein is provided.

According to another aspect of the present invention, a computer program product comprising a non-transitory computer readable storage medium storing a program of instructions executable by a system to perform one or more methods described herein is provided.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present invention relates.

The term "OAuth" refers to an open authorization, commonly used as a way for internet users to log into third party websites using their SNS accounts without exposing their password.

The OAuth includes OpenID Connect.

For example, the following sites uses the OAuth: Box®, Dropbox®, Evernote®, Facebook®, Google®, Instagram®, LinkedIn®, PayPal®, Twitter®, Yahoo® Japan, and Windows Live® and so on.

In OAuth, the following roles are defined: "a resource owner", "a resource server", "a client device", "a client program", "browser" and "an authorization server". The definitions of each of the roles are defined below. The definitions are applicable to an embodiment of the present invention.

The term, "a resource owner", may refer to an entity capable of granting access to a protected resource. When the resource owner is a person, the resource owner is referred to as an end-user.

The term, "a resource server", may refer to a server hosting the protected resources, capable of accepting and responding to protected resource requests using access tokens.

The term, "a client program", may refer to an application making protected resource requests on behalf of the resource owner and with its authorization. The client program is working on the client device associated with the resource owner or on a remote system which is different from the client device.

The term, "browser", may refer to a user agent of the resource owner and a software application for retrieving, presenting and traversing information resources on the World Wide Web. The browser is working on the client device associated with the resource owner. The term, "browser", may be an agent with which an authority from the resource owner has been entrusted.

The term, "an authorization server", may refer to a server issuing access tokens to the client program after successfully authenticating the resource owner and obtaining authorization. The authorization server may be the same server as the resource server or a separate entity.

Prior to explaining an embodiment of the present invention, a conventional diagram for illegally reusing access token by a malware will be explained by referring to FIG. 7.

Figure 7:
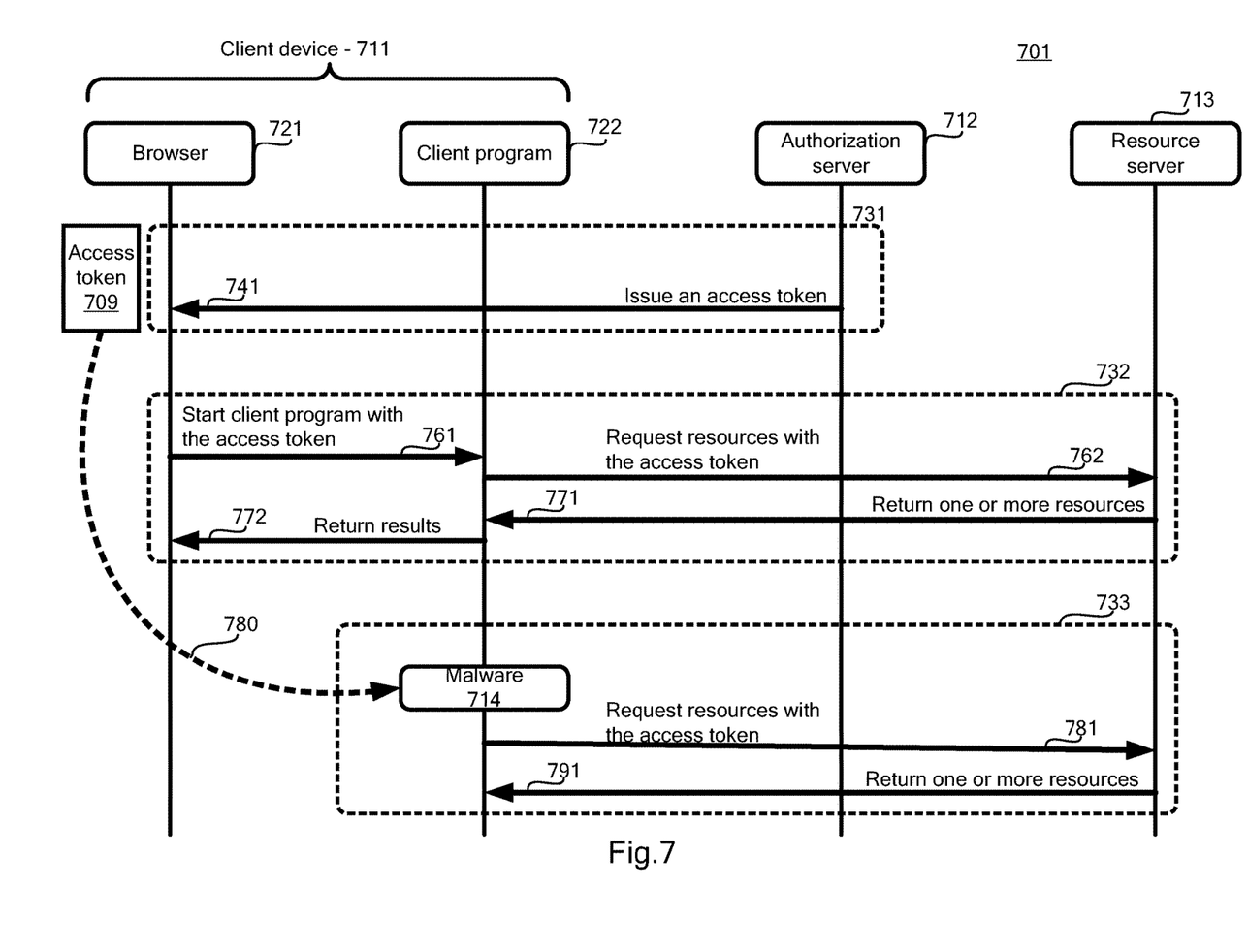
FIG. 7 illustrates a conventional diagram of an overall system for issuing an access token and illegally reusing the access token by a malware.

With reference now to FIG. 7, FIG. 7 illustrates a conventional diagram of an overall system for issuing an access token and illegally reusing the access token by a malware.

The overall system (701) includes a client device (711), an authorization server (712) and a resource server (713).

The client device (711) may execute a browser (721) as a user agent and a client program (722).

The mechanism (731) of issuing an access token may be based on the OAuth protocol. Accordingly, the detailed explanations of issuing an access token will be omitted here.

In the mechanism (731), the authorization server (712) generates an access token (709) and then issues (741) the access token (709) to the browser (721). In response to receipt of the access token (709), the browser (721) stores the access token (709) in a memory in the system (101), such as a main memory (103) described in FIG. 1.

Further, the authorization server (712) redirects the user-agent back to the browser (721), using the redirection URI. In other words, the authorization server (712) returns, to the browser (721), a URI of a page to be displayed next. In response to receipt of the URI, the browser (721) redirects the URI to display contents of the page.

In one embodiment, the access token (709) may be embedded, for example, as a character string, in the URI.

The mechanism (731) is not a key point of an embodiment of the present invention. Accordingly, the detailed explanation of the mechanism (731) is omitted here.

The mechanism (732) of obtaining resources with the access token (709) will be described below.

In response to receipt of the access token (709) on the browser (721) from the authorization server (712), the browser (721) starts (761) the client program (722) with the access token (709).

In response to receipt of the access token (709), the client program (722) requests (762) one or more resources, which may be a protected resource, together with the access token (709) to the resource server (713).

In response to receipt of the request from the client program (722), the resource server (713) validates the access token (709) and, if valid, returns (771) one or more resources to the client program (722).

In response to receipt of the one or more resources from the resource server (713), the client program (722) generates results from the one or more resources and then returns (772) the generated results to the browser (721) to display the generated results on the browser (721).

In general, the access token (709) is valid in a certain time period, for example, a few hours or a day.

The mechanism (733) can illegally obtain the resources from the resource server (713) as will be described below.

In a case where malware (714) is unintentionally installed on the client device (711), the malware (714) illegally takes (780) the access token (709) from the memory in the system (101).

In a case where the malware (714) takes (780) the access token (709), the malware (714) requests (781) resources with the access token (709) to the resource server (713).

In response to receipt of the request from the malware (714), the resource server (713) validates the access token (709) and, if valid, returns (791) one or more resources to the malware (714).

Accordingly, the malware (714) can illegally obtain the resources from the resource server (713).

As described above, the Implicit Grant for the OAuth has a high security risk of access token leakage.

Accordingly, there are leakage problems or illegal use problems of the access token (709).

There are some ideas to overcome these problems described below.

Let us suppose that the authorization server (712) sets a shorter life time of the access token (709) in a case where the authorization server (712) issues the access token (709). However, the authorization server (712) has no way to know how long the client program (722) uses the access token (709). Therefore, the authorization server (712) has to set an long enough life time to the access token (709) to avoid early expiration.

Let us suppose that the authorization server (712) limits the number of uses of the access token (709) in a case where the authorization server (712) issues the access token (709). However, the authorization server (712) has no way to know how many times the client program (722) uses the access token (709). Therefore, the authorization server (712) has to limit the number of use of the access token (709).

Let us suppose that the resource owner explicitly disables the access token (709) by calling the disable application program interface (API). The resource owner is not usually aware of the access token (709). However, in this approach, the resource owner must remember to disable the access token (709). This may cause the resource owner to forget to make the access token (709) invalid. Accordingly, this approach is not friendly to the resource owner.

Let us suppose that resource owner installs a virus scan tool on the client device (711) to detect malware (714). The virus scan tools can detect known viruses. However, the virus scan tools cannot detect new viruses until tool vendors update detection rules for the new viruses. Accordingly, this approach is not perfect in terms of a virus protection.

Consequently, all ideas described above are insufficient.

Accordingly, there is need to avoid a leakage or illegal use of the access token (709) in a different way.

Figure 1:
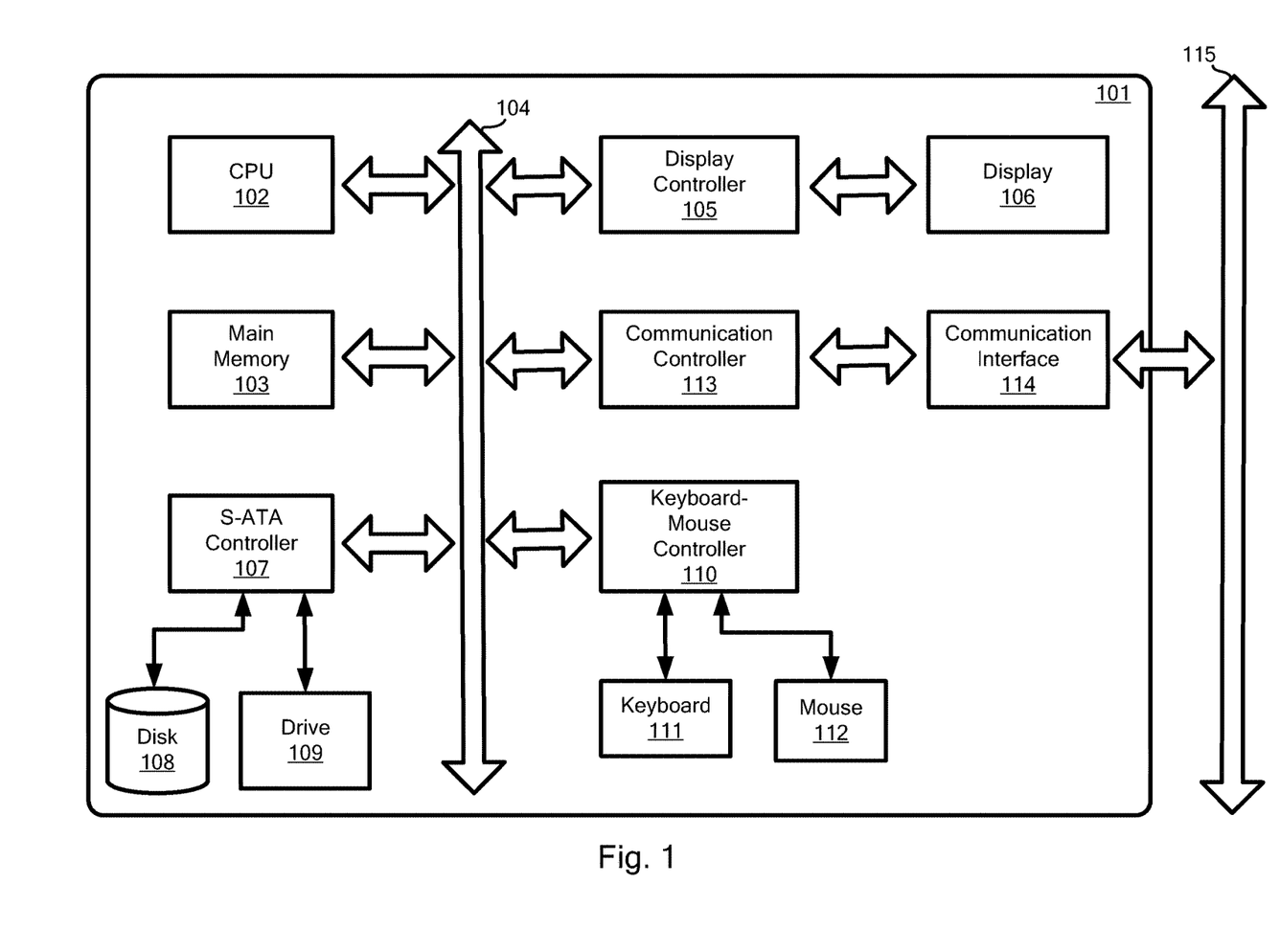
FIG. 1 illustrates an exemplified basic block/flow diagram of a computer hardware used in an embodiment of the present invention.

With reference now to FIG. 1, FIG. 1 illustrates an exemplified basic block/flow diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a BD (Blu-ray disk) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIG. 2, FIG. 3, FIG. 4, FIGS. 5A and 5B, and FIG. 6.

Figure 2:
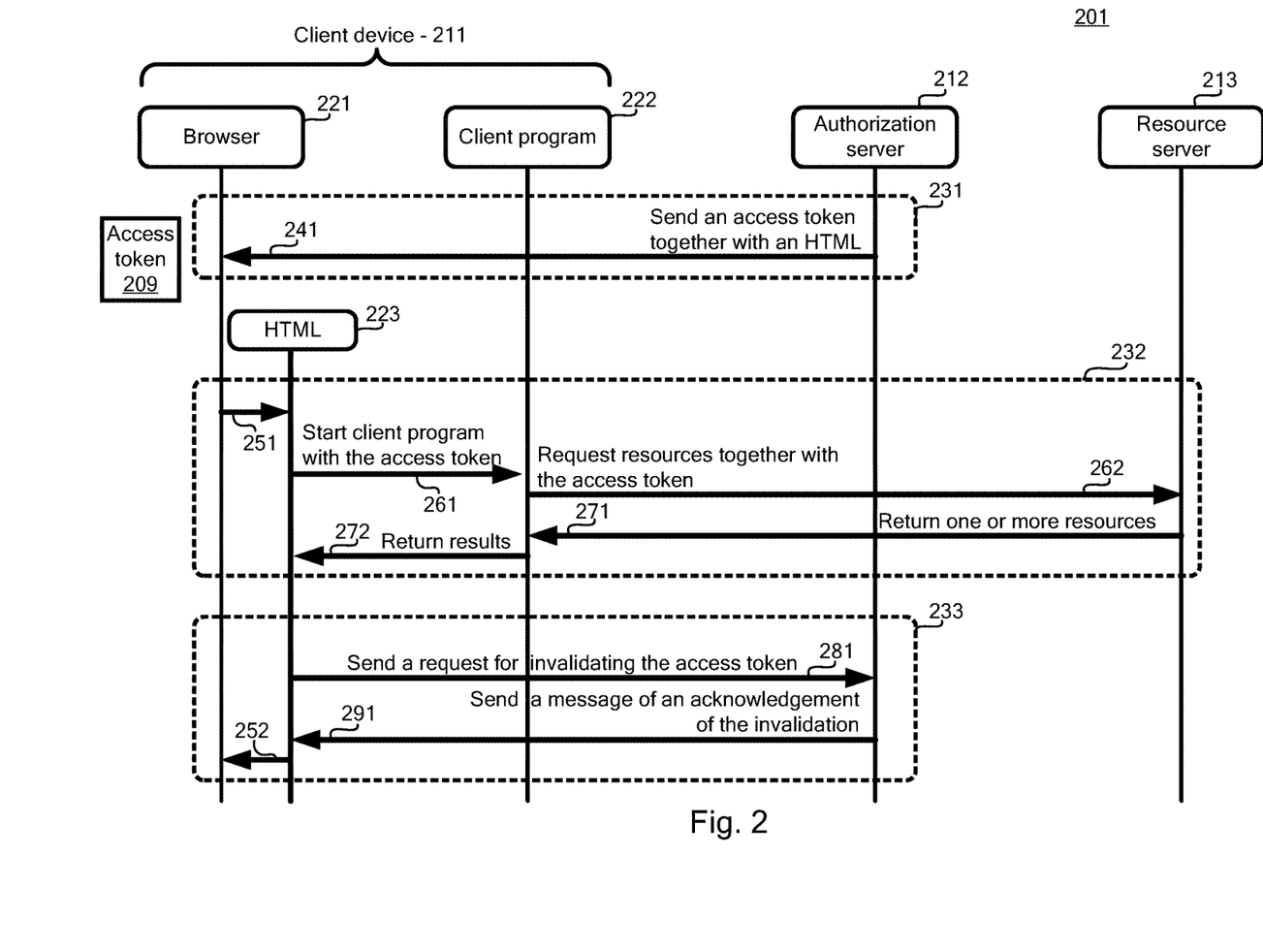
FIG. 2 illustrates an exemplified diagram of an overall system for invalidating an access token among a browser, a client program and an authorization server.

The idea of an embodiment of the present invention is on the basis of disabling the access token (209) just after the client program (222) completes the use of the access token (209).

With reference now to FIG. 2, FIG. 2 illustrates one embodiment of an exemplified diagram of an overall system for invalidating an access token (209) among a browser (221), a client program (222) and an authorization server (212).

The overall system (201) according to an embodiment of the present invention includes a client device (211), an authorization server (212) and a resource server (213).

The client device (211) may execute a browser (221) as a user agent and a client program (222).

The browser (221) may be executed on the client device (211) associated with a resource owner (not shown). The browser (221) may be given an authority from the resource owner.

The client program (222) may be executed on the client device (211) associated with a resource owner (not shown). Alternatively, the client program (222) may be executed on a remote system which is different from the client device (211).

The mechanism (231) of issuing an access token (209) may be based on the OAuth protocol. Accordingly, the detailed explanations of issuing an access token (209) will be omitted here.

In the mechanism (231), the authorization server (212) generates an access token (209) and then issues (241) the access token (209) to the browser (221). In response to receipt of the access token (209), the browser (221) stores the access token (209) in a memory in the system (101), such as a main memory (103) described in FIG. 1.

In the mechanism (231), according to an embodiment of the present invention, the authorization server (212) further generates an HTML comprising the following codes (1) to (3), according to an embodiment of the present invention:

(1) a set of instructions for rendering on one window in a browser;

(2) a code for generating a child segment in a memory which is controlled by the window; and (3) a code for invalidating the access token (209) in response to completion of rendering on the child segment;

a code for invalidating the access token (209) in response to completion of receiving, from a resource server, one or more resources requested by a client program executed on the child segment; or a code for invalidating the access token (209) in response to closing of the window or a parent window.

For code (1) described above, the set of instructions may be used in a memory for rendering contents of a page on one window. The window may be displayed in a tab on the browser (221).

For code (2) described above, the code for generating a child segment may be used for generating a child segment. The child segment can be a memory space for executing the client program (222). The child segment may be in a memory which is controlled by the window.

In a case where the client program (222) is executed in the child segment, a child window on which the rendering result of executing the client program (222) is displayed may be located in a parent window. Accordingly, it can be said that the code for generating a child segment is the same as a code for generating the child window in the parent window.

An illustrative embodiment of the child window will be described below by referring to FIG. 5A.

Figure 5A:
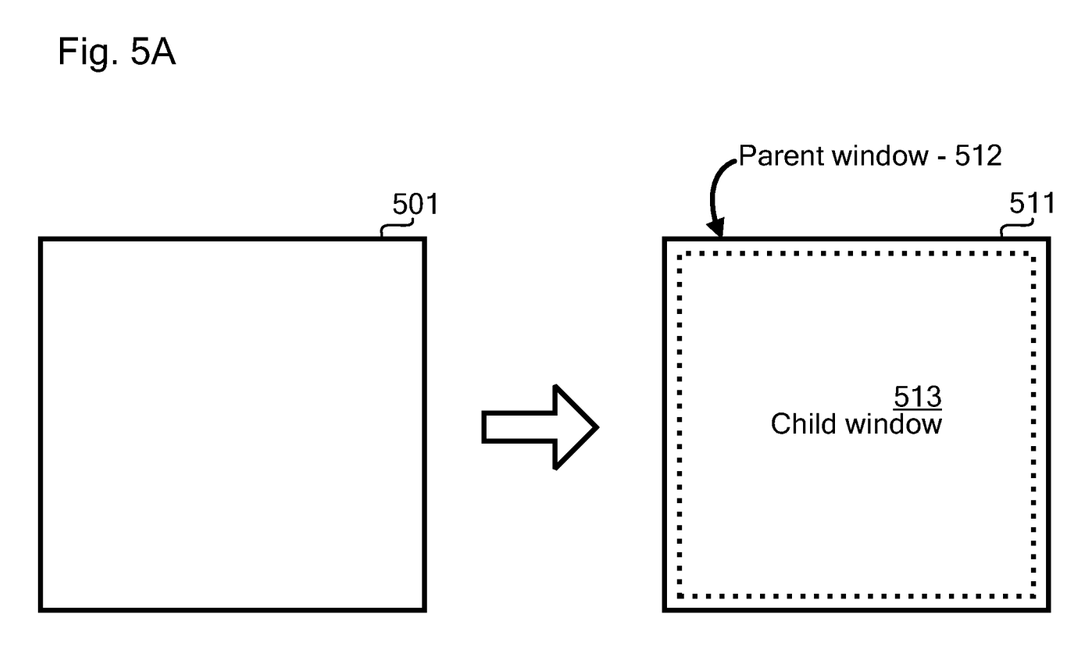
FIG. 5A illustrates a parent window and a parent window on which a child window is displayed.

With reference now to FIG. 5A, FIG. 5A illustrates embodiments of a parent window and the parent window on which a child window is displayed.

The window (501) is displayed on a tab on the browser.

In a case where the code for generating the child segment is executed and then the child segment is generated in a memory which is controlled by the window (501), the results of the rendering in the child segment is displayed on a child window (513). The child window (513) is displayed in the parent window (512) which corresponds to the window (501).

The code for generating the child segment is one described using a program such as HTML tag; Script, for example, JavaScript®; or an Adobe® Flash® content. This child segment is generated, using this code in the HTML file, in the memory which is controlled by the window.

For example, the HTML tag used may be <iframe src='URI'/> and the JavaScript may be "window.open(URI)". These HTML tag and the JavaScript® enables the browser (221) to open URI in the child window.

The child window is considered as a new window with its own document loaded on it. It may be likely that a user may not recognize that the child window (513) is displayed in the parent window (512).

An illustrative embodiment of an iFrame will be described below by referring to FIG. 5B.

Figure 5B:
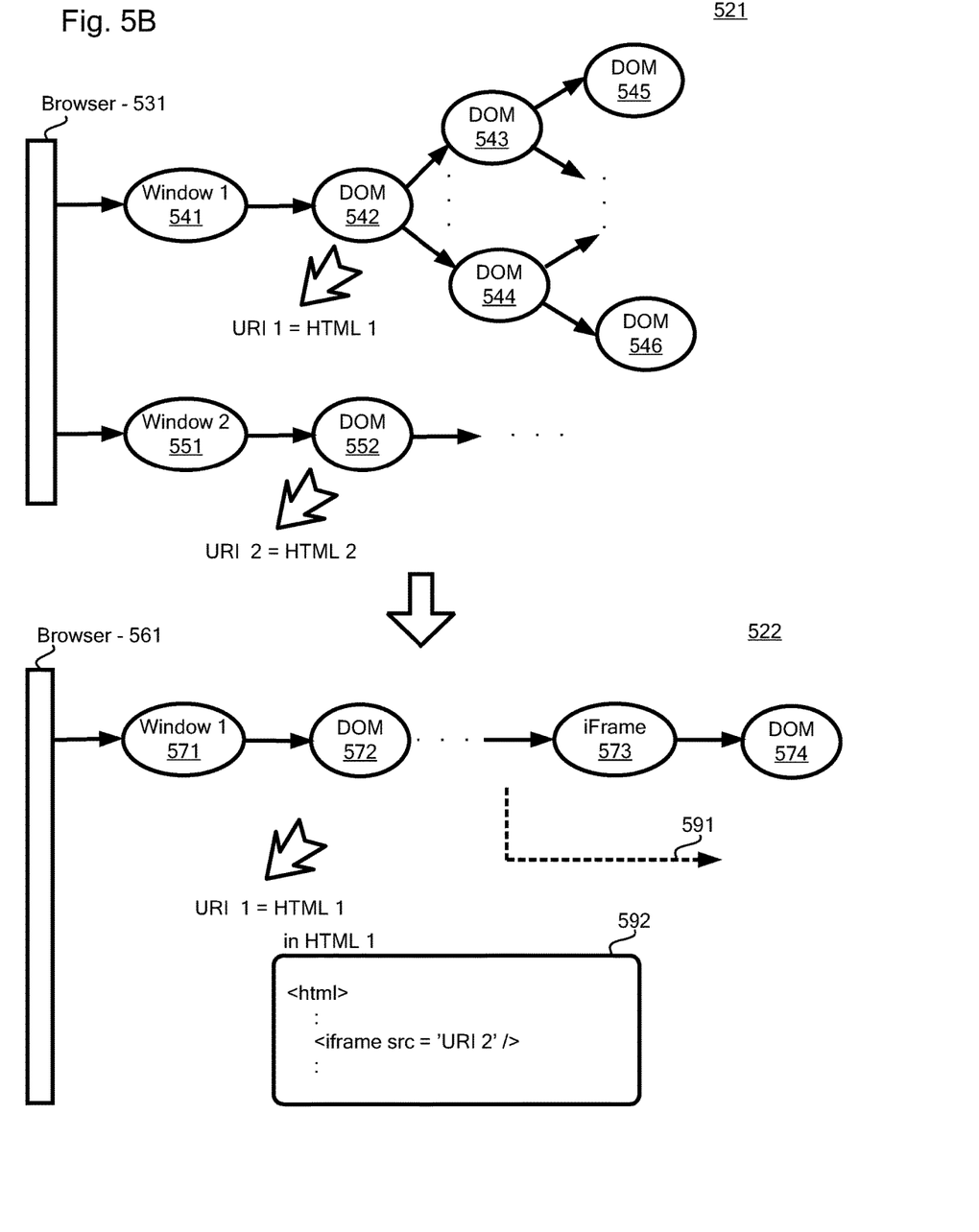
FIG. 5B illustrates a structure of a browser object having one or more window objects, each of the window objects comprising a document object model (DOM) and iFrame.

With reference now to FIG. 5B, FIG. 5B illustrates one embodiment of a structure of browser object having one or more window objects, each of the window objects comprising a document object model (DOM) and iFrame.

For one HTML, one window object and one or more DOMs are prepared.

The structure (521) shows a browser object (531) having a plurality of window objects (541, 551, . . . ). Each of the window objects (541, 551, . . . ) corresponds to a window for displaying a document. Each of the DOMs (551, . . . , 553) correspond to an HTML document.

After the browser parses a HTML1 document for URI1, the window object 1 (541) has one document object model (DOM) (542) which is directly in a lower hierarchy of the window object 1 (541). The DOM (542) may have one or more DOMs (543, . . . , 546). The DOM (542) tree represents the tree structure of the HTML1.

Similarly, after the browser parses a HTML2 document for URI2, the window object 2 (551) has one DOM (552) which is directly in a lower hierarchy of the window object 2 (551), and the DOM (552) may have one or more DOMs (not shown). The DOM (552) tree represents the tree structure of the HTML2.

In a case where the HTML tag for generating the child segment, for example, <iframe src'URI'/>, is executed and then the child segment is generated in a memory which is controlled by the window object 1 (541), an iFrame object will be generated under the window object (541).

The structure (522) shows a browser object (561) having a plurality of window objects (571, 581 . . . ) after the HTML tag mentioned above is executed.

After the browser parses a HTML1 document for URI1, the window object 1 (571) has one DOM (572) which has the same content of the DOM (542) described in structure (521). An iFrame object is a derivative of a DOM and acts as a DOM. Accordingly, the iFrame object (573) is generated in a lower hierarchy of the DOM (572). The results of the execution of the client program are stored in the iFrame (592).

In a case where there is an iFrame in HTML 1 like iFrame (592), an iFrame object is generated in a lower hierarchy of a DOM and then HTML2 is read under the iFrame object. Accordingly, in the structure (522), the HML2 is read under one or more DOMs (574, . . . ) which are in a lower hierarchy of the iFrame object (573). Accordingly, behaviors done by DOMs (574, . . . ) are the same as those done by the widow object 2 (551).

The DOM (574) in the structure (522) and the DOM (552) in the structure (521) are generated from the same HTML. The DOM (574) and the DOM (552) are different with each other as a memory object. Meanwhile, the content of the DOM (574) is the same as that of the DOM (552).

With reference now back to FIG. 2, for the code (3) mentioned above, each of the three codes may be used for invalidating the access token (209). Each of the three codes may comprise a URI for invalidating the access token (209). The URI may be a URI for the authorization server (212).

The mechanism (232) can obtain resources with access token (209), according to an embodiment of the present invention, as will be described below.

In response to receipt of the HTML file, the system reads the HTML file via the browser (221) and then executes codes in the HTML file to open (251) the child window in the parent window. In the child window, the system starts (261) the client program (222) with the access token (209).

In response to start of the client program (222), the client program (222) requests (262) one or more resources, which may be protected resource, together with the access token (209) to the resource server (213).

In response to receipt of the request from the client program (222), the resource server (213) validates the access token (209) and, if valid, returns (271) one or more resources to the client program (222).

In response to receipt (271) of the one or more resources from the resource server (213), the client program (222) generates results from the one or more resources and then returns (272) the generated results to the parent window to display the generated results on the child window.

The parent window sends (281) a request for invalidating the access token (209) to the authorization server (213) in a case where anyone of the following situations (a) to (c) is detected:

(a) a completion of rendering on the child segment;
(b) a completion of receiving, from the resource server (213), one or more resources requested by the client program (222) executed on the child segment; or
(c) closing of the window or the parent window.

The client device (211) can detect the situations (a) to (c) described above, for example, by using a program for detecting either one of such situations.

The mechanism (233) of invalidating the access token (209), according to an embodiment of the present invention, will be described below.

In response to receipt of the request from the client device (211), the authorization server (212) sends (291) a message of an acknowledgement of the invalidation of the access token to the parent window.

In response to receipt of the message from the authorization server (212), the client device (221) closes (252) the parent window.

Therefore, the access token (209) can be automatically invalidated just after the situations described above.

According to an embodiment of the present invention, a leakage of the access token (209) can be protected.

According to an embodiment of the present invention, an illegal use of the access token (209) can be protected.

According to an embodiment of the present invention, a resource owner does nothing to disable the access token (209).

According to an embodiment of the present invention, the process can be used with other existing security measures for token leakage such as expiration of token, limitation of the use of the access token, and malware scanning tools.

Figure 3:
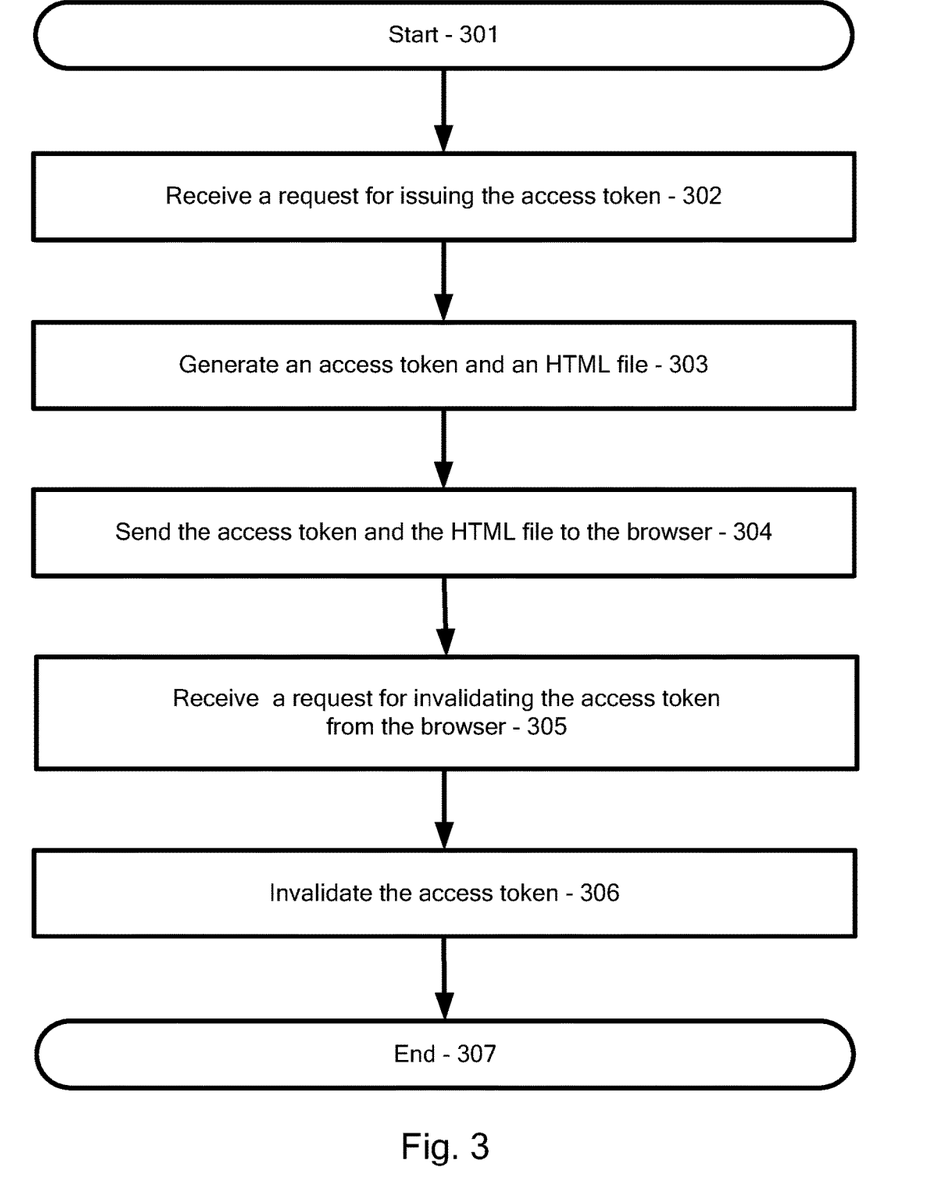
FIG. 3 illustrates a blow/flow diagram of a process for invalidating an access token on an authorization server.
Figure 4:
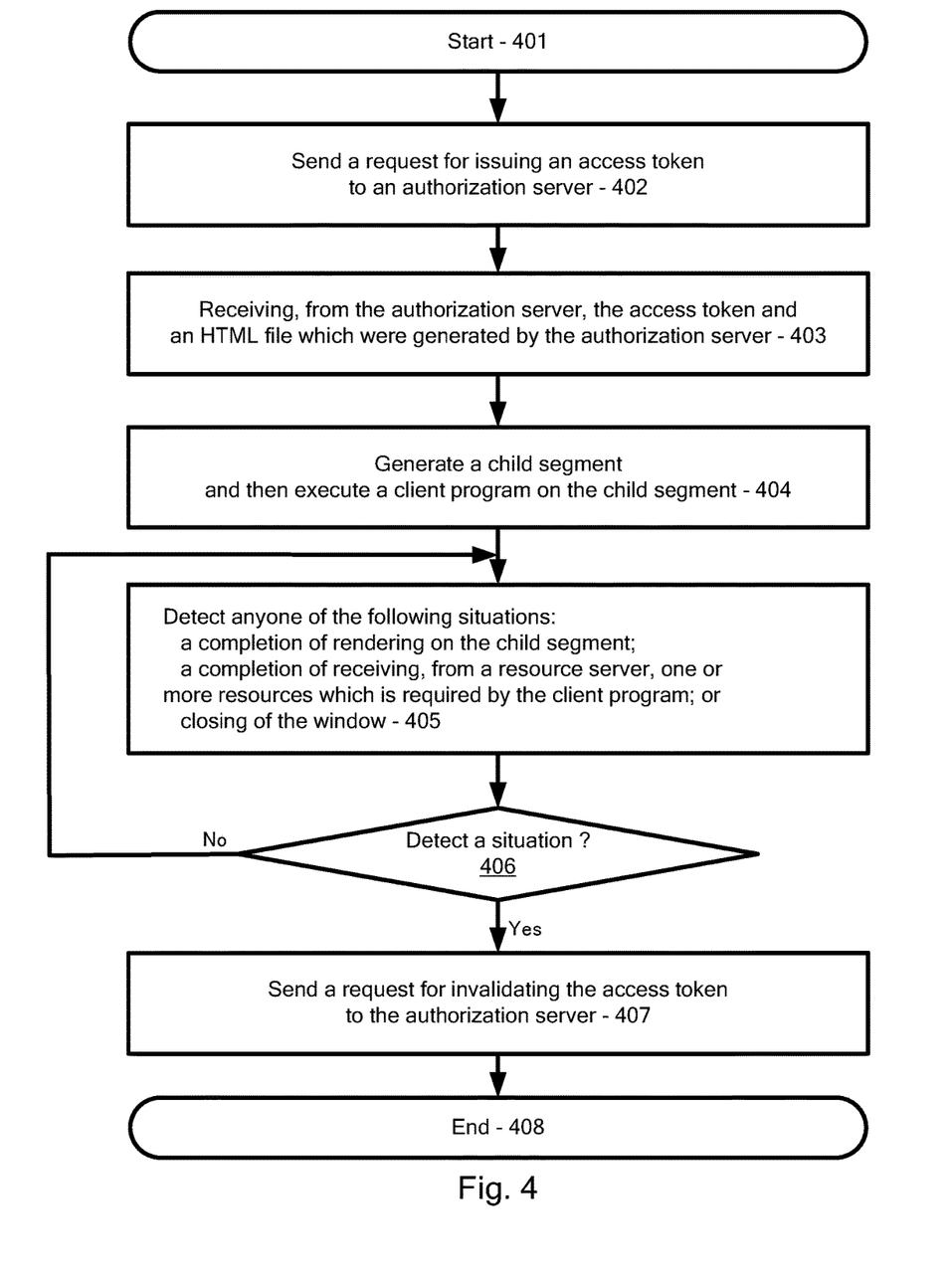
FIG. 4 illustrates a block/flow diagram of a process for invalidating an access token on a client device associated with a resource owner.

FIGS. 3 and 4 illustrate one embodiment of a flowchart of a process for invalidating an access token (209).

With reference now to FIG. 3, FIG. 3 illustrates one embodiment of a flowchart of a process for invalidating an access token (209), all of the steps in the process being executed on an authorization server (212).

The authorization server (212) such as the computer (101) performs each of the steps described in each of FIG. 3. The authorization server (212) may be implemented as a single computer or a plurality of computers.

The authorization server (212) can communicate with the client device (211) via, for example, an internet or an intranet.

In step 301, the authorization server (212) starts the process for invalidating an access token.

In step 302, the authorization server (212) receives a request for issuing an access token from the client device (211).

In step 303, the authorization server (212) generates the access token and an HTML file. The HTML file comprises the codes (1) to (3) described above.

In step 304, the authorization server (212) sends the access token and the HTML file to the browser which is executed on the client device (211).

In step 305, the authorization server (212) receives a request for invalidating the access token from the browser which is executed on the client device (211).

In step 306, the authorization server (212) invalidates the access token.

In step 307, the authorization server (212) terminates the process described above.

With reference now to FIG. 4, FIG. 4 illustrates one embodiment of a flowchart of a process for invalidating an access token, all of the steps in the process being executed on the client device (211) associated with a resource owner.

In step 401, the client device (211) starts the process for invalidating an access token.

In step 402, the client device (211) sends a request for issuing an access token to the authorization server (212).

In step 403, the client device (211) receives, from the authorization server (212), the access token and an HTML file which were generated by the authorization server (212).

In step 404, the client device (211) generates a child segment and then executes the client program on the child segment. In response to the generation of the child segment, the client device (211) displays, in the parent window, a child window on which the rendering result of executing the client program.

In step 405, the client device (211) detects anyone of the situations (a) to (c) described above, for example, by using a program for detecting either one of such situations.

In step 406, the client device (211) determines whether anyone of the situations (a) to (c) is detected or not. If the determination is positive, the client device (211) proceeds to step 407. Meanwhile, if the determination is negative, the client device (211) proceeds back to step 405.

In step 407, the client device (211) sends a request for invalidating the access token to the authorization server (212).

In step 408, the client device (211) terminates the process described above.

Figure 6:
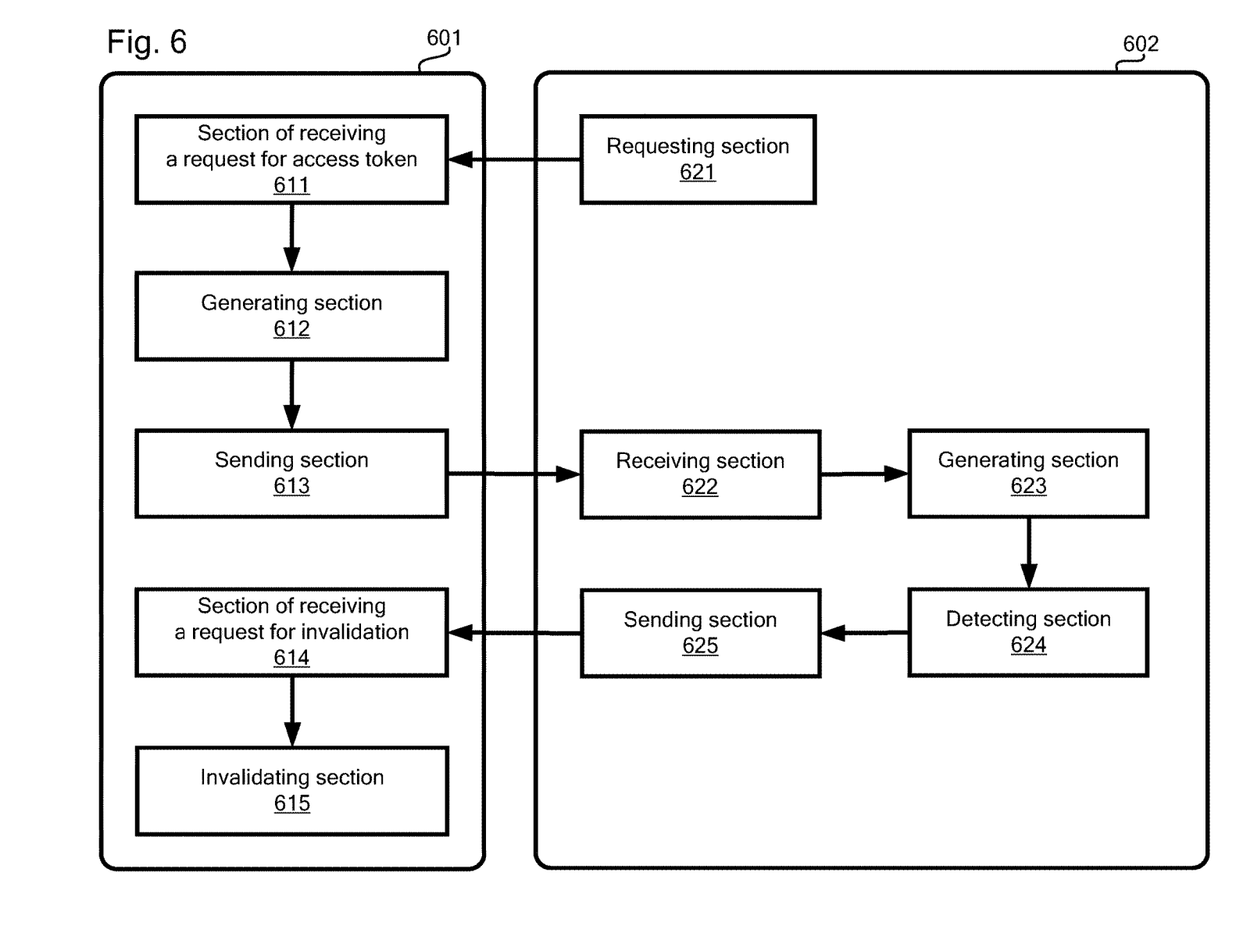
FIG. 6 illustrates an overall functional block/flow diagram of a computer system hardware used in accordance with an embodiment of the present invention.

With reference now to FIG. 6, FIG. 6 illustrates an embodiment of an overall functional block/flow diagram of a computer system hardware used in accordance with an embodiment of the flowcharts described in FIGS. 3 and 4, respectively.

An overall system comprises an authorization server (601) and a client device (602).

The authorization server (601) may correspond to the computer (101) described in FIG. 1.

The authorization server (601) comprises a section for receiving a request for access token (611), a generating section (612), a sending section (613), a section for receiving a request for invalidation (614), and an invalidation section (615).

The section for receiving a request for access token (611) receives a request for issuing an access token from the client device (602).

The section for receiving a request for access token (611) may perform step 302 described in FIG. 3.

The generating section (612) generates the access token and an HTML file in response to receipt of a request for issuing an access token.

The generating section (612) may perform step 303 described in FIG. 3.

The sending section (613) sends the access token and the HTML file to the browser which is executed on the client device (602).

The sending section (613) may perform step 304 described in FIG. 3.

The section for receiving a request for invalidation (614) receives a request for invalidating the access token.

The section for receiving a request for invalidation (614) may perform step 305 described in FIG. 3.

The invalidation section (615) invalidates the access token in response to receipt of a request for invalidating the access token.

The invalidation section (615) may perform step 306 described in FIG. 3.

The client device (602) may comprise, for example, but not limited to, a computer, a portable device such as a smartphone, a cellular phone, a tablet, a smart watch. The computer may correspond to the computer (101) described in FIG. 1.

The client device (602) comprises a requesting section (621), a receiving section (622), a generating section (623), a detecting section (624), and a sending section (625).

The requesting section (621) sends a request for issuing the access token to the authorization server (601).

The requesting section (621) may perform step 402 described in FIG. 4.

The receiving section (622) receives the access token and the HTML file from the authorization server (601).

The receiving section (622) may perform step 403 described in FIG. 4.

The generating section (623) generates the child segment and then executes the client program on the child segment The generating section (623) may perform step 404 described in FIG. 4.

The detecting section (624) detects the situations (a) to (c) mentioned above.

The detecting section (624) may perform step 405 described in FIG. 4.

The sending section (625) sends the request for invalidating the access token to the authorization server (601).

The sending section (625) may perform step 406 described in FIG. 4.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transparent media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transparent cables, optical transparent fibers, wireless transparent, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A computer-implemented method for invalidating an access token, the method comprising:
   generating the access token for authorizing access to protected online resource servers and a Hyper Text Markup Language (HTML) file in response to receipt of a request for issuing the access token, wherein the HTML file comprises a set of instructions for rendering on a window in a browser, a code for generating a child segment in a memory which is controlled by the window, and a code for invalidating the access token in response to completion of rendering on the child segment, the code for invalidating the access token including a Uniform Resource Identifier (URI) for an authorization server;
   sending the access token and the HTML file to the browser; and
   invalidating the access token, in response to receipt, from the browser, of the code for invalidating the access token in response to completion of rendering on the child segment.

2. The method according to claim 1, wherein the access token is issued using OAuth protocol.

3. The method according to claim 1, wherein the code for generating the child segment is one described using a program.

4. The method according to claim 1, wherein the browser is executed on a client device associated with a resource owner.

5. The method according to claim 4, wherein the browser has an authority from the resource owner.

6. The method according to claim 1, wherein the child segment has a display section for the child segment and a result of execution of a client program is displayed on the display section.

7. The method according to claim 6, wherein one or more resources requested by the client program are received, from a resource server, at the client program.

8. The method according to claim 1, wherein generating, sending and invalidating are executed on an authorization server.

9. A computer-implemented method for invalidating an access token, the method comprising:
    generating the access token and a Hyper Text Markup Language (HTML) file in response to receipt of a request for issuing the access token for authorizing access to protected online resource servers, wherein the HTML file comprises a set of instructions for rendering on a window in a browser, a code for generating a child segment in a memory which is controlled by the window, and a code for invalidating the access token in response to closing of the window, the code for invalidating the access token including a Uniform Resource Identifier (URI) for an authorization server;
    sending the access token and the HTML file to the browser; and
    invalidating the access token, in response to receipt, from the browser, of the code for invalidating the access token in response to closing of the window.

10. The method according to claim 9, wherein the access token is issued using OAuth protocol.

11. The method according to claim 9, wherein the code for generating the child segment is one described using a program.

12. The method according to claim 9, wherein the browser is executed on a client device associated with a resource owner.

13. The method according to claim 12, wherein the browser has an authority from the resource owner.

14. The method according to claim 9, wherein the child segment has a display section for the child segment.

15. The method according to claim 9, wherein generating, sending and invalidating are executed on an authorization server.

16. A computer-implemented method for invalidating an access token, the method comprising:
    receiving, from an authorization server, the access token for authorizing access to protected online resource servers and a Hyper Text Markup Language (HTML) file generated by the authorization server, wherein the HTML file comprises a set of instructions for rendering on a window in a browser, a code for generating a child segment in a memory which is controlled by the window, and a code for invalidating the access token in response to completion of receiving, from a resource server, one or more resources requested by a client program executed on the child segment, the code for invalidating the access token including a Uniform Resource Identifier (URI) for an authorization server;
    generating the child segment and executing the client program on the child segment; and
    sending the code for invalidating the access token in response to completion of receiving, from the resource server, the one or more resources, the code for invalidating the access token instructing the authorization server to invalidating the access token.

17. The method according to claim 16, wherein the access token was issued using OAuth protocol.

18. A system, comprising:
    a memory storing a program which, when executed on a processor, performs a method for invalidating an access token, the method comprising:
    generating the access token for authorizing access to protected online resource servers and a Hyper Text Markup Language (HTML) file in response to receipt of a request for issuing the access token, wherein the HTML file comprises a set of instructions for rendering on a window in a browser, a code for generating a child segment in a memory which is controlled by the window, and a code for invalidating the access token in response to completion of rendering on the child segment, the code for invalidating the access token including a Uniform Resource Identifier (URI) for an authorization server;
    sending the access token and the HTML file to the browser; and
    invalidating the access token, in response to receipt, from the browser, of the code for invalidating the access token in response to completion of rendering on the child segment.

19. The system according to claim 18, wherein the access token is issued using OAuth protocol.

20. A computer program product for invalidating an access token, the computer program product comprising a non-transitory computer usable storage medium having program instructions embodied therewith, the program instructions executable by a computer to cause the computer to perform a method comprising:
    generating the access token for authorizing access to protected online resource servers and a Hyper Text Markup Language (HTML) file in response to receipt of a request for issuing the access token, wherein the HTML file comprises a set of instructions for rendering on a window in a browser, a code for generating a child segment in a memory which is controlled by the window, and a code for invalidating the access token in response to completion of rendering on the child segment, the code for invalidating the access token including a Uniform Resource Identifier (URI) for an authorization server;
    sending the access token and the HTML file to the browser; and
    invalidating the access token, in response to receipt, from the browser, of the code for invalidating the access token in response to completion of rendering on the child segment.

21. The computer program product according to claim 20, wherein the access token is issued using OAuth protocol.

* * * * *